United States Patent

Fazio et al.

[15] 3,674,931

[45] July 4, 1972

[54] DARK CURRENT CLAMP FOR TELEVISION CAMERA WITH A CIRCULAR FIELD OF VIEW PERMITTING MAXIMUM UTILIZATION OF VIDICON TARGET

[72] Inventors: James A. Fazio, Liverpool, N.Y.; William H. Wesbey, New Berlin, Wis.

[73] Assignee: General Electric Company

[22] Filed: Dec. 8, 1969

[21] Appl. No.: 883,101

[52] U.S. Cl. .......... 178/7.1 DC
[51] Int. Cl. .......... H04n 5/18
[58] Field of Search .......... 178/7.2 E, 7.1 DC, 7.1 E

[56] References Cited

UNITED STATES PATENTS 3,126,447 3/1964 Bendell .......... 178/7.1 DC

FOREIGN PATENTS OR APPLICATIONS 776,764 1/1957 Great Britain .......... 178/7.1 DC

OTHER PUBLICATIONS

RCA TN No: 257 June 1959

*Primary Examiner*—Robert L. Griffin
*Assistant Examiner*—Donald E. Stout
*Attorney*—Frank L. Neuhauser, Oscar B. Waddell, James B. Forman, Michael Masnik and James J. Williams

[57] ABSTRACT

A vidicon camera, operated in an overscan condition in order to obtain high resolution and sensitivity, employs a mask around the periphery of the target. Dark current clamp circuitry is made dependent on target current in the masked region, with the clamp pulse generated only at a time when the beam is sensing the portion of the target behind the mask so as to avoid producing horizontal streaks in the portion of the image containing the video information desired to be viewed. In conjunction with an X-ray image intensifier presenting a circular display, a circular ring-shaped mask permits a maximum amount of information to be viewed.

12 Claims, 14 Drawing Figures

INVENTORS:
JAMES A. FAZIO,
WILLIAM H. WESBEY,
BY Marvin Snyder
THEIR ATTORNEY.

INVENTORS
JAMES A. FAZIO,
WILLIAM H. WESBEY,
BY Marvin Snyder
THEIR ATTORNEY.

INVENTORS:
JAMES A. FAZIO,
WILLIAM H. WESBEY,
BY Marvin Snyder
THEIR ATTORNEY.

DARK CURRENT CLAMP FOR TELEVISION CAMERA WITH A CIRCULAR FIELD OF VIEW PERMITTING MAXIMUM UTILIZATION OF VIDICON TARGET

INTRODUCTION

This invention relates to vidicon cameras, and more particularly to a high resolution, high sensitivity vidicon camera for use in conjunction with X-ray image intensifiers.

Vidicon camera tubes typically employ a circular target on which is focused the image being viewed. The target is scanned by an electron beam which sweeps in horizontal paths of uniform length across the target until an entire rectangular raster has been covered by the beam. As the beam passes across the target, amplitude of current flow through the target at any instant is dependent upon intensity of light illuminating the point of the target struck by the electron beam at that instant.

In television practice, it is conventional to clamp the black level of a television signal to a potential corresponding to that of the darkest element of the image. This is satisfactory for viewing images wherein portions thereof are readily recognizable to the viewer, since he can thus establish a frame of reference for the remainder of the image. However, in images wherein there may be no such recognizable portion, it is possible that no portion is absolutely black, only gray. By using a conventional black level clamp under such conditions, the gray portions would then be displayed as black, and the white portions would appear gray. In displays of X-ray images, where the viewer is attempting to interpret or understand the images, his understanding can be greatly facilitated if the black portions of the displayed images represent detection of black portions of the scene being displayed, since a frame of reference for intensity of light is thus established.

In order to establish a black level representative of true black, the potential sensed must be representative of true black. This may be accomplished, as in the present invention, by sensing dark current, or current flowing through the vidicon target when the electron beam is made to operate in an overscan condition so as to impinge upon a nonilluminated region of the target. To ensure that a region of the target is nonilluminated, the invention described herein employs a mask over a portion of the target, preventing any illumination from falling upon the masked-off region. In this manner; true black level is readily established.

In viewing X-ray images with television monitors, image intensifiers are often employed. These devices serve to amplify the image, so that minimal exposure to X-rays can produce a clear display. The shape of the image displayed by image intensifiers is usually circular, which conveniently matches the circular-shaped target of vidicons. This enables maximum utilization of vidicon target area, enabling the vidicon to operate at maximum sensitivity and resolution. By employing a circular mask around the periphery of the target, a region for sensing dark current may thus be provided. Heretofore, however, dark current clamp pulses have been made to occur at the same instant in time along each horizontal line scanned by the electron beam. If such pulses should occur while the beam is scanning within the raster, one or more horizontal streaks would appear across the center of the display. In conventional television practice, this problem may be readily avoided, since the rectangular raster is formed completely within the circular vidicon target so that there is ample area outside the raster which may be masked off for sensing dark current. However, when sensing the circular image provided by an image intensifier, as in the present invention, substantially the entire target of the vidicon within the masked-off region is filled with the image furnished by the image intensifier. Moreover, to achieve maximum sensitivity and resolution, the masked-off region is made as narrow as possible, so as to allow utilization of a maximum area of the vidicon target. As a result, if the dark current clamp pulse were conventionally produced, either it would occur during the display, resulting in appearance of the aforementioned horizontal streaks across the center of the display, or else true dark current would not be sensed at all, since target current in the uppermost and lowermost horizontal lines would be sensed when the electron beam had been swept beyond the masked-off portion of the target. In the latter case, horizontal streaks would appear across the upper and lower portions of the display.

Accordingly, one object of the invention is to provide television apparatus which permits display of X-ray images with a true black level.

Another object is to provide apparatus for permitting a vidicon pickup tube to transmit images with improved resolution.

Another object is to provide apparatus for permitting a vidicon camera tube to pick up images with improved sensitivity.

Another object is to provide a dark current clamp which permits maximum utilization of a vidicon target without interfering with the detected image.

Briefly, in accordance with a preferred embodiment of the invention, a dark current clamp for a substantially circular image detected by the target of a vidicon pickup tube comprises vertical sweep generating means controlling the vertical position of a scanning electron beam within the vidicon, and circuit means responsive to the vertical sweep generating means for generating a signal of curved waveform in synchronism with the vertical sweep signal. Pulse generating means responsive to the circuit means are provided for initiating a clamp pulse in each horizontal scan of the electron beam at a time dependent upon instantaneous amplitude of the curved waveform signal. The curved waveform is of configuration to cause each clamp pulse to be generated at a time, respectively, when the electron beam impinges on the target of the vidicon pickup tube outside the target region on which the image is focused.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
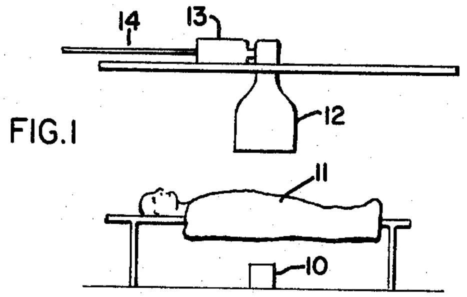
FIG. 1 is an illustration of the type of environment in which the present invention is typically employed.

In FIG. 1, a source of X-rays 10 is shown in position to emit X-rays through a subject 11 toward an image intensifier 12. The image intensifier conveniently may comprise a 9423 Dual Field Image Intensifier sold by Thompson-Houston Paris, France. X-ray image intensifiers of this type produce displays which are circular in shape. Apparatus 13 including a vidicon pickup tube views the scene presented by the image intensifier display and transmits the detected scene in the form of video signals through a cable 14 to a location shielded from the X-rays produced by source 10. At the shielded location, the scene may be safely viewed on one or more television monitor screens by personnel trained to interpret X-ray images.

Figures 2, 3:
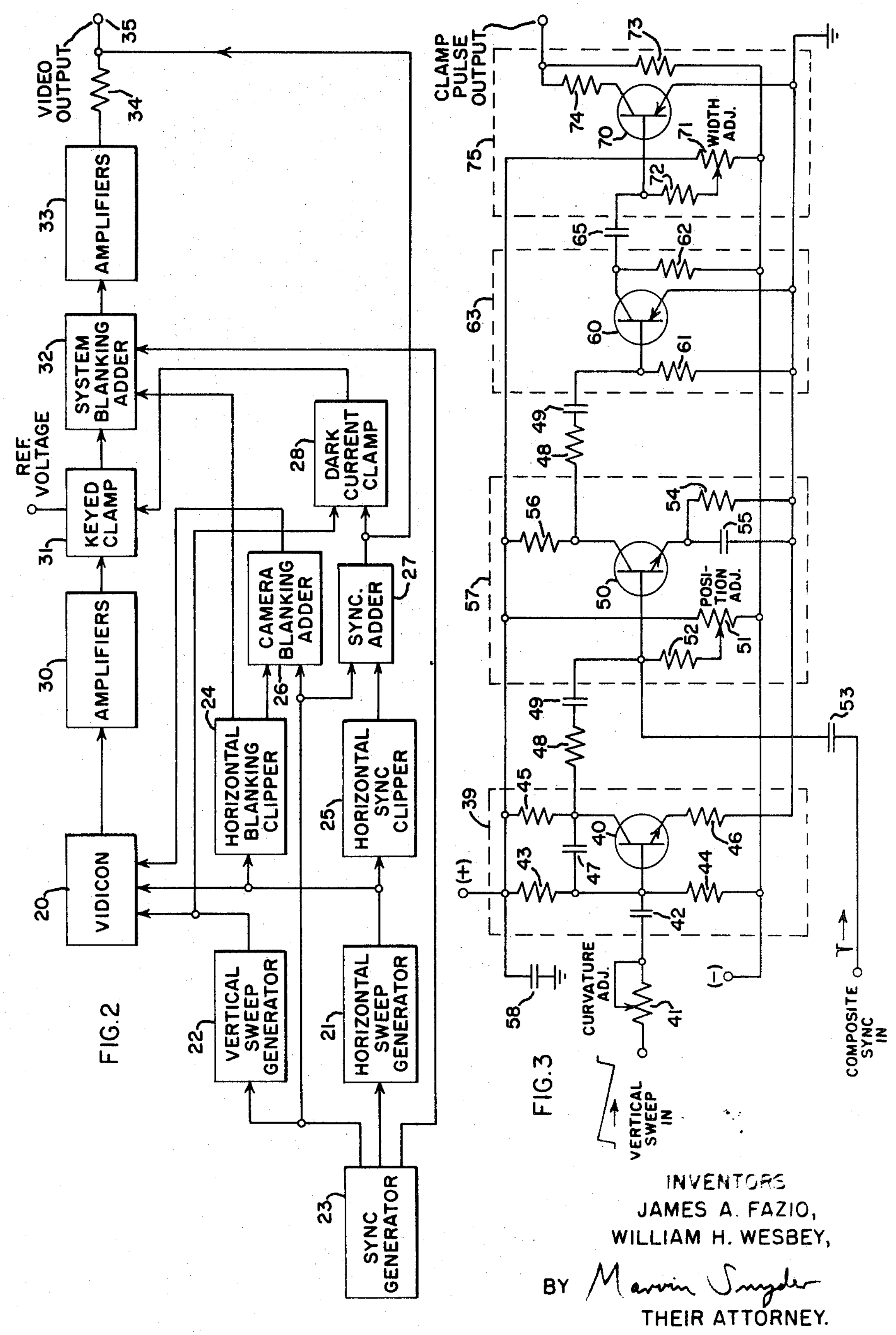
FIG. 2 is a block diagram illustrating use of the present invention in circuitry employed in conjunction with a vidicon pickup tube.
FIG. 3 is a schematic diagram of dark current clamp circuitry employed in the instant invention.

FIG. 2 is a block diagram of circuitry employed in conjunction with a vidicon pickup tube 20 sensing the scene displayed by an X-ray image intensifier. Vidicon pickup tube 20 contains an electron beam which is swept across a circular-shaped target horizontally at a rate determined by a horizontal sweep generator 21 and vertically at a rate determined by a vertical sweep generator 22. Horizontal and vertical sweep generators 21 and 22 are synchronized by pulses from a sync generator 23.

Horizontal sweep generator 21 applies voltage pulses to the horizontal deflection coil, or yoke, of the vidicon, so that horizontal deflection coil current rises linearly. The increasing horizontal deflection coil current electromagnetically deflects the electron beam within the vidicon, horizontally, at a uniform rate across the vidicon tube target. Flyback pulses, produced by interaction of the horizontal deflection yoke and circuitry of horizontal sweep generator 21 are supplied to a horizontal blanking clipper 24 and a horizontal sync clipper 25. These flyback pulses are wider at the base than near the zenith. The clipped flyback pulses furnished by horizontal blanking clipper 24 to one input of a camera blanking adder 26 are of relatively brief duration, since the flyback pulses, for this purpose, are clipped near their zenith. Camera blanking adder 26 receives a second input signal in the form of a pulse from sync generator 23 occurring at twice the frame rate, or at the rate of each vertical sweep of the vidicon electron beam. The total signal thus produced by camera blanking adder 26 is applied to the vidicon in order to turn off, or blank, the vidicon electron beam during each horizontal and vertical retrace of the beam.

Horizontal sync clipper 25 also clips the flyback pulses near their zenith so as to furnish a first input signal, comprising short-duration pulses occurring at horizontal line rate, to a sync adder circuit 27. Sync adder 27 also receives pulses occurring at a vertical sweep rate from sync generator 23, enabling it to produce a composite sync signal representative of horizontal and vertical sync. Except during each vertical retrace interval, the composite sync signal comprises only horizontal sync, as produced by horizontal sync clipper 25. The composite sync signal is furnished to one input of dark current clamp circuitry 28, while the vertical sweep signal, comprising a linear ramp voltage, is furnished to a second input of dark current clamp circuitry 28 from vertical sweep generator 22.

A video signal is furnished from the target of vidicon 20 through amplifiers 30 to the signal input of a keyed clamp circuit 31. The keyed clamp circuit also receives a control pulse, occurring once per horizontal line, from dark current clamp circuit 28. Upon occurrence of each control or keying pulse, the video signal is clamped to a reference voltage. This establishes a reference level for black in each horizontal line in the scene as scanned by the vidicon.

The video signal thus containing the proper black level reference voltage is then furnished to a system blanking adder 32. Blanking adder 32 also receives a signal from horizontal blanking clipper 24, and a signal from sync generator 23 occurring at the vertical retrace rate, or twice the frame rate. The signal furnished to blanking adder 32 by horizontal blanking clipper 24 comprises a pulse of longer duration than the pulse supplied by clipper 24 to blanking adder 26 which, in turn, is of longer duration than the pulse furnished to sync adder 27 by horizontal sync clipper 25. This increase in width is obtained by clipping the horizontal flyback pulse at a lower amplitude level, since the flyback pulse is wider near its base than near its zenith. In addition, the pulse furnished from sync generator 23 to system blanking adder 32 is of greater duration than that furnished to camera blanking adder 26. Thus, blanking adder 32 adds blanking to the video signal received from keyed clamp 31 for a duration slightly greater than that added by camera blanking adder 26, so as to begin blanking slightly earlier than the blanking furnished by camera blanking adder 26 and end blanking slightly later than the blanking furnished by camera blanking adder 26. This serves to remove transients on either side of the portion of video signal blanked by the camera blanking adder.

The output signal of system blanking adder 32 is furnished through amplifiers 33 and resistance 34 to an output terminal 35, which may then be coupled to utilization means (not shown), such as closed circuit television monitor apparatus. In addition, the composite sync signal produced by sync adder 27 is supplied to the output side of resistance 34 so as to combine with the video signal during occurrence of each keying pulse furnished to keyed clamp 31 in order to furnish the sync signals which are necessary to reproduce the sensed scene on display apparatus at a monitor.

The apparatus of FIG. 2 thus described would operate satisfactorily, for many purposes, if keyed clamp 31 were keyed at the same instant of time during each horizontal scan of the vidicon electron beam. In such operation, a rectangular raster portion of the circular vidicon target is swept by the electron beam, and a dark current clamp pulse may be made to occur when the beam is in an overscan condition; that is, the horizontal flyback pulse returns the beam to a starting point outside the raster region of the target and keying of the keyed clamp circuitry, if made to occur while the beam is outside the raster region, is not visible in the display at the receiver. On the other hand, if the clamp circuitry were keyed while the beam were inside the raster region, an objectionable vertical black bar or line would be visible in the display.

A problem arises, however, when the vidicon is to be employed as a high sensitivity, high resolution pickup device. Under these circumstances, which occur when the vidicon is to be used in conjunction with an image intensifier of the type described supra, the scene to be sensed comprises the image intensifier display. This display is typically circular in configuration. While such display allows maximum utilization of the vidicon target area, being that the target is also circular in configuration, and thereby results in greater resolution and sensitivity produced by the vidicon, the keyed clamp pulse would still occur at the same instant in time in each horizontal sweep of the electron beam. As a result, one or more horizontal streaks would appear in at least a portion of the detected image and thus interfere with any attempt at interpreting the X-ray display picked up from the image intensifier. This undesirable condition is avoided in the present invention by employing a dark current clamp of the type described in conjunction with the apparatus of FIG. 3, so as to key the keyed clamp only at times when the horizontal position of the electron beam in the vidicon is outside the region of the target on which the scene is focused. In addition, the black level of the vidicon signal produced by the vidicon is clamped to the level of dark current, thereby ensuring existence of a constant black level reference regardless of light intensity in any elemental portion of the scene being transmitted by the vidicon. This constant black level facilitates accurate interpretation of X-ray displays viewed by the vidicon.

To briefly recapitulate operation of the apparatus of FIG. 2, the electron beam of vidicon 20 is swept horizontally by pulses produced by horizontal sweep generator 21 and vertically by a ramp voltage produced by vertical sweep generator 22. Relatively narrow horizontal sync pulses, produced by clipping horizontal flyback pulses near their zenith in horizontal sync clipper 25, are furnished to one input of sync adder 27. Horizontal blanking pulses, of greater width than the horizontal sync pulses, are produced by clipping horizontal flyback pulses closer to their base by horizontal clipper 24 than by horizontal sync clipper 25. The horizontal blanking pulses are supplied to one input of each of camera blanking adder 26 and system blanking adder 32, with the pulses furnished to system blanking adder 32 being of greater duration than those furnished to camera blanking adder 26 by causing the pulses to be supplied to camera blanking adder 26 to be clipped closer to the zenith of the horizontal flyback pulses than the pulses to be supplied to system blanking adder 32. In addition, sync generator 23 furnishes vertical blanking pulses of slightly greater duration to system blanking adder 32 than to camera blanking adder 26. The composite narrow horizontal and vertical blanking pulses are furnished by camera blanking adder 26 to vidicon 20, so as to produce blanking during each horizontal and vertical retrace of the vidicon electron beam.

Sync adder 27 combines the narrow horizontal sync pulses produced by horizontal sync clipper 25 with the vertical blanking pulses furnished by sync generator 23 to camera blanking adder 26 and furnishes a composite sync signal to one input of dark current clamp 28, the second input of which receives the ramp signal produced by vertical sweep generator 22.

The dark level of the amplifier video signal produced by vidicon 20 is clamped by keyed clamp 31 to a predetermined reference voltage upon occurrence of each output signal of sync adder 27. Dark current clamp 28 is so constructed as to produce clamp pulses in each frame which occur progressively earlier in each horizontal line until the vertical center of the frame is reached, and then produce the clamp pulses progressively later in each horizontal line until the bottom of the frame has been reached. This enables each clamp pulse to be produced while the electron beam impinges upon the target outside of the circular area on which the scene to be televised is focused. The video signal, thus clamped, is furnished to an output terminal through a system blanking adder 32, which adds blanking slightly wider than that added to the vidicon in order to eliminate transient voltages remaining on either side of the vidicon blanking signal. Composite sync is inserted by sync adder 27 during the blanking intervals, so that a complete video output signal appears at output terminal 35.

FIG. 3 comprises a schematic diagram of dark current clamp circuit 28 illustrated in FIG. 2. The circuit comprises an integrator stage 39 including an NPN transistor 40 receiving a vertical sweep signal at its base from vertical sweep generator 22, shown in FIG. 2, through a rheostat 41 in series with a coupling capacitance 42. The base of transistor 40 is maintained at a predetermined D.C. potential by resistances 43 and 44, connected in series between sources of positive and negative voltage, while collector bias is furnished through a load resistance 45 and emitter bias is furnished across a resistance 46 coupled to ground. The collector and base of transistor 40 are coupled through an integrating capacitance 47. The source of positive bias is bypassed to ground through a capacitance 58.

Output signals from the collector of transistor 40 are R-C coupled through a resistance 48 and capacitance 49 to the base of an NPN transistor 50 of a pulse generator stage 57. Transistor 50 receives base bias through the variable tap of a potentiometer 51 and a current limiting resistance 52 in series therewith. In addition, composite sync pulses, produced by sync adder 27 shown in FIG. 2, are coupled through a capacitance 53 to the base of transistor 50. Emitter bias for transistor 50 is furnished through a resistance 54 coupled to ground and bypassed for frequencies of horizontal line rate by a capacitance 55. Collector bias is furnished through a load resistance 56.

Output signals from the collector of transistor 50 are R-C coupled through a resistance 48 and capacitance 49 to the base of a PNP transistor 60 of a phase inverter stage 63 across a base bias resistance 61. Negative collector bias is furnished through a load resistance 62, while the emitter of transistor 60 is grounded.

Output signals from the collector of transistor 60 are coupled through a capacitance 65 to the base of a PNP transistor 70 of a pulse generator stage 75. The base of transistor 70 receives negative bias through the variable tap of a potentiometer 71 in series with a current limiting resistance 72. Negative collector bias is furnished through a collector load resistance 73 in series with a collector bias resistance 74. The emitter of transistor 70 is grounded. Output clamp pulses are furnished to keyed clamp 31 of FIG. 2 from the junction common to resistances 73 and 74.

Figures 4A, 4B, 4C:
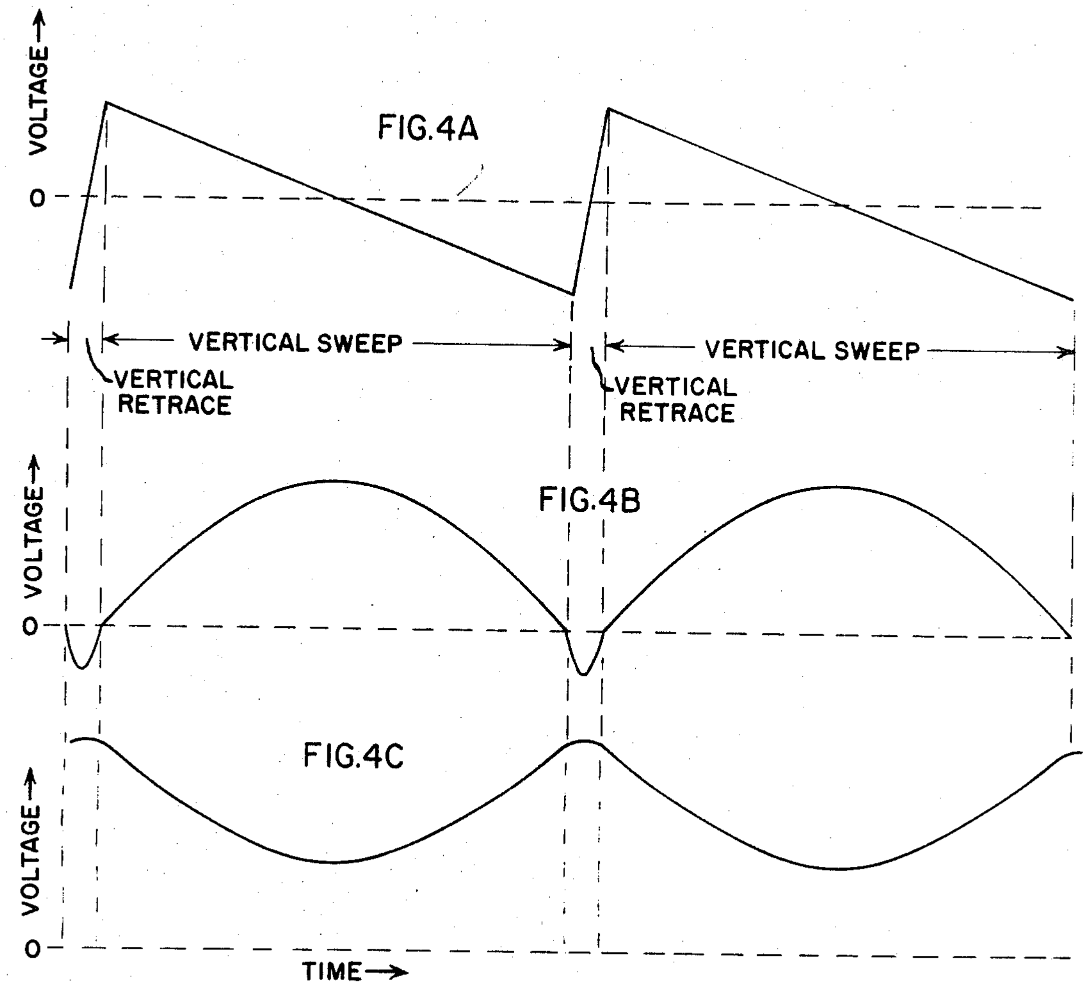
FIGS. 4A – 4C are illustrations of voltage waveforms, plotted on a common time base, to assist in explaining operation of the circuitry of FIG. 3.

In operation, vertical sweep voltages, such as illustrated in FIG. 4A, are coupled to the base of transistor 40 through capacitance 42. An input circuit comprising resistance 41 and capacitance 42 in series with capacitance 47, resistance 45 and capacitance 58 is thus presented to the vertical sweep waveform. This input circuit comprises an integrating circuit in that it includes a resistance, represented by rheostat 41, in series with a capacitance 47 which is R-C coupled to ground through resistance 45 and capacitance 58. The integrated voltage waveform appearing across capacitance 47 in series with resistance 45 and capacitance 58 thus approximates a parabola for each of the vertical sweep and vertical retrace intervals, respectively, as illustrated in FIG. 4B. The waveform of FIG. 4B, during the vertical sweep, may be made more or less curved by respectively decreasing or increasing the resistance added by curvature adjust rheostat 41. The base-to-emitter circuitry of transistor 40 is connected in shunt with the series circuit comprising capacitance 47, resistance 45 and capacitance 58, so that the waveform of FIG. 4B appears on the base of transistor 40. Accordingly, as base voltage increases, due to curvature of the waveform applied thereto, collector current through resistance 45 correspondingly decreases, and vice-versa. Accordingly, collector voltage on transistor 40 assumes a shape substantially inverse to that on the base of the transistor, with some flattening occurring during vertical retrace intervals due to the transistor being driven close to saturation. The voltage waveform at the collector of transistor 40 is illustrated in FIG. 4C.

Figures 5A, 5B, 5C, 5D, 5E:
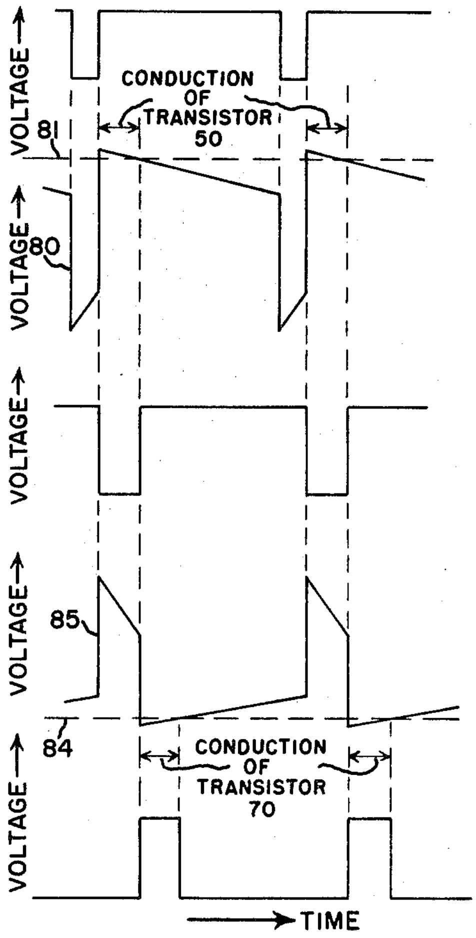
FIGS. 5A – 5E are additional illustrations of voltage waveforms, plotted on a common time base, to further assist in explaining operation of the circuitry of FIG. 4.

Composite sync pulses are furnished to pulse generator 57 through capacitance 53, together with the curved signal produced at the collector of transistor 40 and a D.C. bias furnished by pulse position adjust potentiometer 51. The composite sync pulses which, as illustrated in FIG. 5A comprise the horizontal sync pulses except during vertical retrace intervals, are differentiated through capacitance 53 in series with resistance 52, a portion of resistance 51, and capacitance 58, so that the pulses applied to the base of transistor 50 are differentiated composite sync pulses. Each time the voltage amplitude of the composite sync pulse, when added to the curved voltage supplied by transistor 40 and the bias furnished by potentiometer 51, exceeds the conduction level of transistor 50, the transistor is driven into conduction. During conduction of transistor 50, base voltage does not rise to a high amplitude due to the low base input resistance presented by the conducting transistor; when the transistor becomes nonconductive, the rate at which base voltage decays is relatively slow, due to the small voltage remaining on capacitor 53. The net result is illustrated in FIG. 5B, wherein the differentiated pulses 80 are shown in relation to the base voltage level 81 at which transistor 50 becomes conductive. It can be seen, in FIG. 5B, that transistor 50 remains conductive as long as the differentiated pulse amplitude exceeds the conduction level of transistor 50. This illustration, moreover, represents the situation when the curved voltage produced at the collector of transistor 40 is approximately at its minimum value. As the curved voltage changes, however, so that its slope is not approximately zero, the relative voltage level of individual pulses 80 similarly changes, so that the earlier pulses are of greater voltage level than the later pulses if the slope of the curved waveform is negative, and the earlier pulses are of lower voltage level than the later pulses if the slope of the curved waveform is positive. As a result, transistor 50 is rendered conductive for longer intervals by the earlier pulses when the slope of the curved waveform is negative, and is rendered conductive for longer intervals by the later pulses when the slope of the curved waveform is positive.

Each time transistor 50 is driven into conduction, it conducts at a saturation current value since bypass capacitor 55 represents substantially no appreciable impedance to signals occurring at the horizontal line rate. Accordingly, rectangular timing pulses, such as illustrated in FIG. 5C, are produced at the collector of transistor 50. Duration of these pulses decreases with decreasing amplitude of the curved waveform at the collector of transistor 40, and increases with increasing amplitude of this curved waveform.

The negative-going rectangular pulses produced at the collector of transistor 50 are supplied to the base of PNP transistor 60, which is connected in a grounded emitter configuration. Accordingly, a phase inversion is accomplished by transistor 60, so that positive-going rectangular timing pulses are produced at the collector of transistor 60. These positive-going pulses are of durations equal to their corresponding negative-going pulses, respectively, produced at the collector of transistor 50.

The positive-going pulses produced at the collector of transistor 60 are supplied to a differentiator circuit comprising capacitance 65 in series with resistance 72, a portion of the resistance of pulse width adjust potentiometer 71, and capacitance 58. Therefore, the differentiated pulses from phase inverter stage 63 are applied across the resistances in shunt with the base-to-emitter circuit of transistor 70. The circuit of pulse generator 75 is similar in operation to that of pulse generator 57, with the exception that polarity is inverted and a PNP transistor is employed in pulse generator 75. Hence, when the leading edge of the positive-going pulse on the collector of transistor 60 is differentiated, the positive-going voltage on the base of transistor 70 allows the transistor to remain in a nonconductive condition. However, when the voltage resulting from differentiation of the trailing edge of the positive-going pulse produced by transistor 60 is applied to the base of transistor 70, the transistor is driven into conduction by the negative voltage on the base thereof being driven to a negative value below the conduction level of transistor 70. Thus, initiation of conduction of transistor 70 occurs upon termination of a timing interval of duration demarcated by the interval in which transistor 50 is conductive.

During conduction of transistor 70, base voltage does not rise to a high amplitude due to the low base input resistance presented by the conducting transistor; when the transistor becomes nonconductive, the rate at which base voltage decays is relatively slow, due to the small voltage remaining on capacitor 65. The net result is illustrated in FIG. 5D, wherein the differentiated pulses 85 are shown in relation to the negative base voltage level 84 at which transistor 70 becomes conductive. It can be seen, in FIG. 5D, that transistor 70 remains conductive as long as the differentiated pulse amplitude exceeds the conduction level of transistor 70 in the negative direction. The conduction interval of transistor 70, moreover, may be varied by varying the position of the tap on potentiometer 71 so as to adjust the D.C. bias on the base of the transistor. Transistor 70, which is also connected in a grounded emitter configuration, becomes saturated when driven into conduction, producing a positive-going rectangular pulse at its collector upon each conduction interval, as illustrated in FIG. 5E. The rectangular pulse thus generated comprises the clamp pulse output which is supplied to keyed clamp 31, illustrated in FIG. 2.

In accordance with the foregoing description of operation of the circuit of FIG. 3, it can be seen that a clamp pulse is generated once during each horizontal scan of the vidicon electron beam, as determined by the composite sync pulse supplied to the base of transistor 50. Duration of the clamp pulse is controllable by pulse width adjust potentiometer 71. Since each curved waveform produced at the collector of transistor 40 lasts for the duration of a single vertical sweep pulse, the position of the clamp pulse in each horizontal line is determined by instantaneous amplitude of the curved waveform. This curvature may be made either more or less pronounced by the setting of curvature adjust rheostat 41. In addition, the position of all clamp pulses in their respective horizontal lines may be shifted by an equal amount by variation of pulse position adjust potentiometer 51. The effect of these adjustments may be readily understood by referring to FIG. 6, which illustrates occurrence of the clamp pulses in each frame. If the graphical illustration having an abscissa demarcating time and an ordinate demarcating horizontal lines of each frame be considered a conventional rectangular raster, then a plurality of horizontal lines are scanned, with the first starting at the top and the final ending at the bottom of the raster. The clamp pulses are represented by curved line 86, occurring at different times, once during each horizontal scan. Thus, variation of pulse width adjust potentiometer 71 of FIG. 3 controls the thickness of line 86, while the setting of pulse position adjust potentiometer 51 controls the location of curved line 86 along the time abscissa. The setting of curvature adjust potentiometer 41 controls the amount of curvature extant in line 86.

Figures 7, 8:
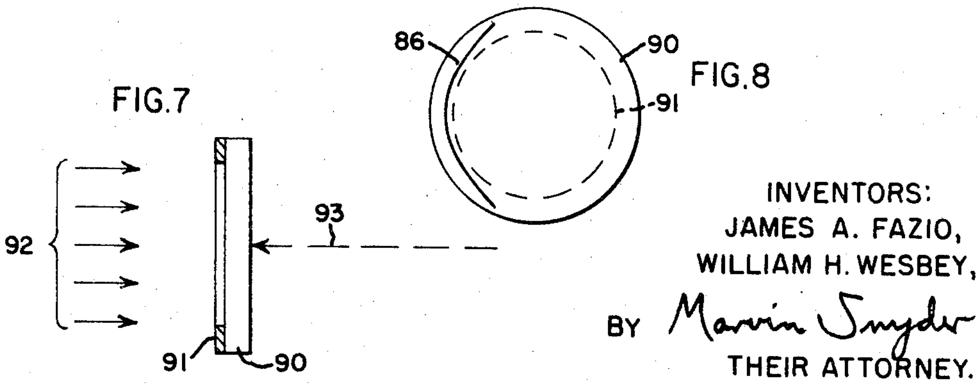
FIG. 7 is a partially cutaway side view showing location of a mask in relation to the target of a vidicon pickup tube.
FIG. 8 is a rear view of a masked vidicon target showing the locus of points of impingement of the electron beam thereon at the instant of occurrence of each dark current clamp pulse.
Figure 6:
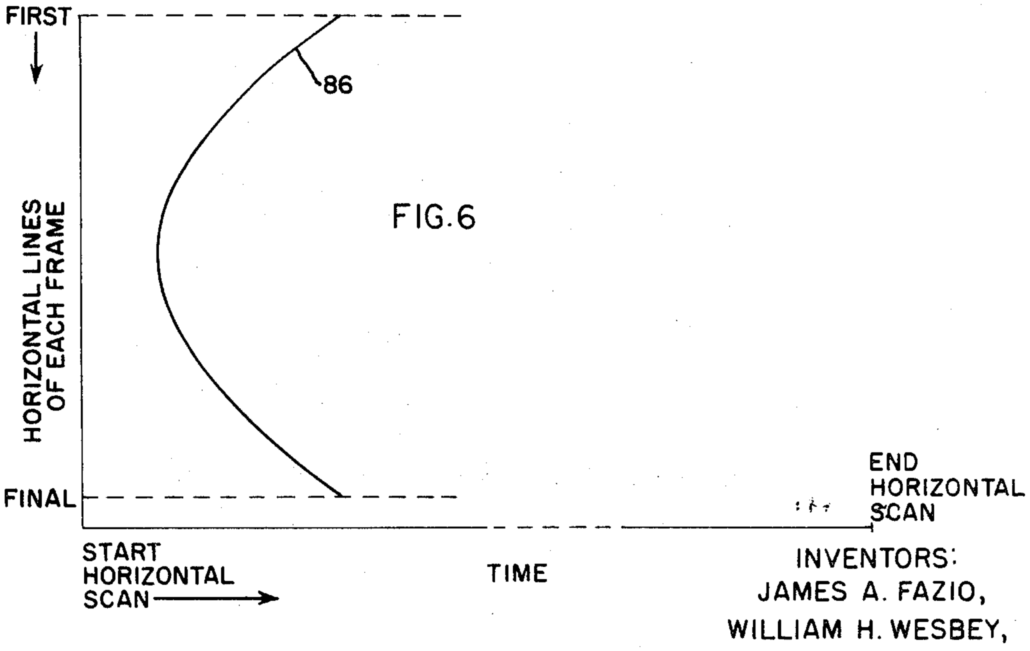
FIG. 6 is a graphical illustration of the effect on a video raster produced by the dark current clamp of the instant invention.

The reason for generating clamp pulses in the manner illustrated in FIG. 6 may be readily understood by referring to FIG. 7, which illustrates the target 90 of the vidicon employed in the instant invention. A light mask 91, shown partially in section, is situated between light rays 92 emitted by the scene being viewed, and target 90. The opposite side of the target is scanned by an electron beam 93, in conventional fashion. As previously described, target 90 is of circular configuration, and mask 91 is of circular ring-shaped configuration.

Viewing target 90 from the location of the electron beam origin, as illustrated in FIG. 8, the circular ring-shaped configuration of mask 91 may be seen on circular target 90. Superimposed on mask 91 is the configuration of line 86, described in conjunction with the illustration of FIG. 6, and representing the locus of points on the target struck by the electron beam at the instant of occurrence of each clamp pulse. It can be seen that clamp pulses 86 occur when the electron beam impinges on the target outside the active target region; that is, outside the region of the target illuminated by the scene. The portion of the target shielded from light by mask 91 is completely dark, so that target current sensed upon occurrence of each clamp pulse represents true dark level. Moreover, it should also now be apparent that if the clamp pulses occurred at the same time during each horizontal scan, so that locus 86 were of a straight line configuration, the system would function improperly. This is because the clamp pulse would not only occur during scanning of the masked dark portion of target 90, where the black level is clamped to dark current, but would also occur either during detection of the scene being viewed, producing one or more horizontal streaks in the center of the display where the black level is clamped to the video signal instead of dark current, or after the beam has been swept horizontally beyond the target so that no target current at all (i.e. darker-than-dark current) is being produced by action of the electron beam, producing one or more horizontal streaks at the top and bottom of the display where the black level is clamped to darker-than-dark current instead of dark current, or both. The curved temporal alignment of clamp pulses 86 avoids this condition and the erroneous signals which would thus result.

The foregoing describes television apparatus which permits display of X-ray images with a true black level. The apparatus includes a vidicon camera tube for picking up images with improved sensitivity and transmitting them with improved resolution. The invention provides a dark current clamp permitting maximum utilization of a vidicon target without interfering with the detected image.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A dark current clamp for a substantially circular image sensed by the target of a vidicon pickup tube comprising:

vertical sweep generating means controlling the vertical position of a scanning electron beam within said vidicon pickup tube;

circuit means responsive to said vertical sweep generating means for generating a signal of curved waveform configuration in synchronism with said vertical sweep signal; and pulse generating means responsive to said circuit means for initiating a clamp pulse in each horizontal scan of said electron beam at a time dependent upon the instantaneous amplitude of said curved waveform signal, said curved waveform signal being of configuration to cause each said clamp pulse to be generated at a time, respectively, when said electron beam impinges on said target outside the region of said target illuminated by the image being detected.

2. The apparatus of claim 1 in which said circuit means comprises an integrator circuit.

3. The apparatus of claim 1 wherein said pulse generating means comprises timing means coupled to said circuit means for demarcating, during each horizontal scan of said electron beam, an interval of duration dependent upon instantaneous amplitude of said curved waveform signal, and a pulse generator coupled to said timing means for initiating said clamp pulse upon termination of each demarcated interval, respectively.

4. The apparatus of claim 2 wherein said pulse generating means comprises a first pulse generator coupled to said integrator circuit for initiating a timing pulse at substantially the same instant of time during each horizontal scan of said electron beam, each said timing pulse produced by said first pulse generator being of duration dependent upon instantaneous amplitude of said curved waveform signal, and a second pulse generator coupled to said first pulse generator for initiating said clamp pulse upon termination of each timing pulse, respectively, produced by said first pulse generator.

5. The apparatus of claim 1 in which said target is masked against light around at least a portion of its periphery, and said circuit means initiates a clamp pulse during each horizontal scan of the electron beam at a time when said scanning electron beam impinges on the region of said target behind the masked portion thereof.

6. The apparatus of claim 5 in which said circuit means comprises an integrator circuit.

7. The apparatus of claim 5 wherein said pulse generating means comprises timing means coupled to said circuit means for demarcating, during each horizontal scan of said electron beam, an interval of duration dependent upon instantaneous amplitude of said curved waveform signal, and a pulse generator coupled to said timing means for initiating said clamp pulse upon termination of each demarcated interval, respectively.

8. The method of clamping a video signal resulting from detection of a substantially circular scene on the target of a vidicon camera tube containing an electron beam operable in a scanning mode, said scene filling all except a peripheral portion of said vidicon target, comprising the steps of:

generating a voltage waveform of curved amplitude configuration during each image frame; and initiating a dark current clamp pulse during each horizontal scan of said target by an electron beam within said vidicon camera tube at a time determined by instantaneous amplitude of said voltage waveform, each said pulse thereby occurring only when said electron beam impinges upon said target behind said peripheral portion thereof.

9. The method of clamping a video signal of claim 8 including the step of masking said peripheral portion of said vidicon target so as to prevent light from impinging thereon.

10. The method of clamping a video signal of claim 8 wherein the step of generating a voltage waveform of curved amplitude configuration during each image frame comprises providing a vertical sweep signal of ramp voltage configuration to deflect the electron beam in said vidicon camera tube, and integrating each ramp of said vertical sweep signal.

11. The method of clamping a video signal of claim 8 wherein the step of initiating a dark current clamp pulse during each horizontal scan of said target by an electron beam comprises timing an initial interval during each horizontal scan of said electron beam of duration dependent upon instantaneous amplitude of said curved waveform signal, and initiating said clamp pulse upon termination of each initial interval, respectively.

12. The method of clamping a video signal of claim 9 wherein the step of generating a voltage waveform of curved amplitude configuration during each image frame comprises providing a vertical sweep signal of ramp voltage configuration to deflect the electron beam in said vidicon camera tube, and integrating each ramp of said vertical sweep signal.

* * * * *